(12) United States Patent
Iwahashi et al.

(10) Patent No.: US 8,057,890 B2
(45) Date of Patent: Nov. 15, 2011

(54) COMPOSITE OF ALUMINUM ALLOY AND RESIN AND MANUFACTURING METHOD THEREOF

(75) Inventors: Makoto Iwahashi, Nagoya (JP); Michiyuki Nakase, Nagoya (JP); Masanori Naritomi, Tokyo (JP); Naoki Andoh, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 613 days.

(21) Appl. No.: 12/096,672

(22) PCT Filed: Dec. 7, 2006

(86) PCT No.: PCT/JP2006/324493
§ 371 (c)(1), (2), (4) Date: Jan. 12, 2009

(87) PCT Pub. No.: WO2007/066742
PCT Pub. Date: Jun. 14, 2007

(65) Prior Publication Data
US 2009/0274889 A1 Nov. 5, 2009

(30) Foreign Application Priority Data
Dec. 8, 2005 (JP) .................................. 2005-355422

(51) Int. Cl.
*B32B 3/30* (2006.01)
*B29C 44/04* (2006.01)

(52) U.S. Cl. ............... 428/312.2; 428/312.8; 428/315.5; 428/319.3; 428/319.7; 428/613; 428/616; 428/624; 428/650; 428/474.4; 428/458; 264/35; 264/45.4; 264/46.7; 264/46.8; 264/48; 264/241

(58) Field of Classification Search .................. None
See application file for complete search history.

(56) References Cited

U.S. PATENT DOCUMENTS
2006/0055084 A1   3/2006   Yamaguchi et al.

FOREIGN PATENT DOCUMENTS
| JP | 7-329707 A | 12/1995 |
| JP | 2001-225352 A | 8/2001 |
| JP | 2006-315398 A | 11/2006 |
| WO | 2004/055248 A1 | 7/2004 |

OTHER PUBLICATIONS

Translation of JP-2001-225352.*
International Search Report of PCT/JP2006/324493, date of mailing Mar. 20, 2007.

* cited by examiner

*Primary Examiner* — Ling Xu
(74) *Attorney, Agent, or Firm* — Westerman, Hattori, Daniels & Adrian, LLP

(57) ABSTRACT

The surface of an aluminum alloy shaped product is covered with ultrafine recesses by being dipped in an eroding aqueous solution, or has formed thereon a metal oxide layer covered with the openings of ultrafine pores by anodizing. On the resin side, there is prepared a polyamide resin compounded with an impact resistance modifier, a mixture of an aliphatic polyamide and an aromatic polyamide, or a mixture of aromatic polyamides. The aluminum alloy shaped product is inserted into an injection mold, and a polyamide-type resin composition is injected onto the surface of the aluminum alloy shaped product, to manufacture an integrated composite.

16 Claims, 1 Drawing Sheet

COMPOSITE OF ALUMINUM ALLOY AND RESIN AND MANUFACTURING METHOD THEREOF

TECHNICAL FIELD

The present invention relates to a composite of an aluminum alloy and high-strength resin, used in chassis of electronic devices, chassis of household electric appliances, structural parts, mechanical parts and the like, and to a method for manufacturing such a composite. More specifically, the present invention relates to a structure in which there are integrated a thermoplastic synthetic resin and a light-metal alloy shaped product, manufactured through various mechanical processes, to a composite of a light-metal alloy and a resin, used in various electronic devices, household electric appliances, medical devices, automotive structural parts, automotive on-board articles, construction material parts as well as other structural parts, exterior parts and the like, and to a method for manufacturing such a composite.

BACKGROUND

Technologies for integrating together, via an adhesive, heterogeneous materials in the form of a metal and a synthetic resin are demanded in a wide variety of technical fields and industries, such as automobiles, household electrical articles, industrial equipment and the like, to which end numerous adhesives are being developed on an ongoing basis. In this context, some excellent adhesives have been proposed. Adhesives that fulfill their function at normal temperature, or by heating, are used for bonding a metal and a synthetic resin into a single whole, in what is now an ordinary technology.

However, research has been conducted also on more rational bonding methods in which no adhesive is used. Methods have thus been proposed in which a light-metal alloy of magnesium, aluminum and alloys thereof, and iron alloys such as stainless steel or the like, are integrated with a high-strength engineering resin, without any intervening adhesive. Among these methods, a method that involves, for instance, inserting an aluminum alloy part into an injection mold, into which a resin component is then injected to elicit bonding (hereinafter, "injection bonding") has just begun to be put into practice by the applicants, for combinations that include, at the time of writing, aluminum alloys and polybutylene terephthalate resins (hereinafter "PBT"), and polyphenylene sulfide resins (hereinafter, "PPS").

As far as the applicants know, the above invention is the first invention that discloses the feature to the effect that injection bonding is possible by way of combinations of such metals and synthetic resins. The inventors have found that bonding strength (also called "fixing strength" in the present invention) increases specifically when an aluminum alloy shaped product is dipped in an aqueous solution of a water-soluble amine compound, is washed with water, is dried, and is then inserted into an injection mold, into which there is injected a thermoplastic synthetic resin composition having PBT or the like as a main component (Patent documents 1, 2, and 3). The inventors have found that a preferred surface treatment, learned from experience in liquid treatments of metals, allows stabilizing the resulting product, making it possible as a result to injection-bond a polyamide resin and an aluminum alloy. This invention was proposed in Japanese Patent Application Laid-open No. 2006-315398.

The inventors went on to develop polyamide resins to be used, with a view to finding resin compositions appropriate for injection bonding. As a result, the inventors perfected the present invention upon finding that characteristic polyamide resin compounds are appropriate for injection bonding.

[Patent document 1] Japanese Patent Application Laid-open No. 2003-200453

[Patent document 2] Japanese Patent Application Laid-open No. 2004-268936

[Patent document 3] International Patent No. WO 2004/041532

As described above, it was found that preparing a shaped product covered with ultrafine recesses, inserting the aluminum alloy shaped product into an injection mold, and injecting a polyamide resin composition into the injection mold, yields an integrated article in which there are bonded an aluminum alloy portion and a molded resin molded product. A lingering challenge was the question of whether such bonding strength between the resin portion and the aluminum alloy portion can be further increased depending on the compound of polyamide resin, among other approaches.

DISCLOSURE OF THE INVENTION

In the light of the above-described technical background, the present invention achieves the following purposes.

An object of the present invention is to provide a composite of an aluminum alloy and a resin, having a stronger bonding strength between an aluminum alloy and a thermoplastic synthetic resin composition that comprises a polyamide resin as a main component, and to provide a method for manufacturing the composite.

A further object of the present invention is to provide a composite of an aluminum alloy and a resin, having high productivity during bonding of an aluminum alloy and a thermoplastic synthetic resin composition that comprises a polyamide resin as a main component, and to provide a method for manufacturing the composite.

The present invention achieves the above objects on the basis of the following means.

The metal-resin composite 1 of the present invention comprises an aluminum alloy part the surface of which is covered with recesses having a number average inner diameter of 10 to 80 nm, as observed under an electron microscope, through a process of dipping in an aqueous solution of one or more compounds selected from ammonia, hydrazine, and a water-soluble amine compound; and a thermoplastic synthetic resin composition part, which is fixed by injection molding to the surface of the aluminum alloy part and which has a resin composition having a polyamide resin as a main component and an impact resistance modifier as an auxiliary component.

The metal-resin composite of Invention 2 comprises an aluminum alloy part the surface of which is covered with recesses having a number average inner diameter of 10 to 80 nm, as observed under an electron microscope, through a process of dipping in an aqueous solution of one or more compounds selected from ammonia, hydrazine, and a water-soluble amine compound; and a thermoplastic synthetic resin composition part, which is fixed by injection molding to the surface of the aluminum alloy part and which has a main resin composition in which an aliphatic polyamide resin and an aromatic polyamide resin are simply mixed and/or the aliphatic polyamide resin and the aromatic polyamide resin are molecularly bonded.

The metal-resin composite of Invention 3 comprises an aluminum alloy part the surface of which is covered with recesses having a number average inner diameter of 10 to 80 nm, as observed under an electron microscope, through a process of dipping in an aqueous solution of ammonia, hydrazine, or a water-soluble amine compound; and a thermoplastic synthetic resin composition part, which is fixed by injection molding to the surface of the aluminum alloy part and which has a resin composition having as a main component two or more aromatic polyamides selected from a group of different types of aromatic polyamides.

The metal-resin composite of Invention 4 comprises an aluminum alloy part formed by anodizing and covered with a surface having holes the openings of which have a number average inner diameter of 10 to 80 nm as measured under electron microscope observation; and a thermoplastic synthetic resin composition part, which is fixed by injection molding to the surface of the aluminum alloy part and which has a resin composition having a polyamide resin as a main component and an impact resistance modifier as an auxiliary component.

The metal-resin composite of Invention 5 comprises an aluminum alloy part formed by anodizing and covered with a surface having holes the openings of which have a number average inner diameter of 10 to 80 nm as measured under electron microscope observation; and a thermoplastic synthetic resin composition part, which is fixed by injection molding to the surface of the aluminum alloy part and which has a main resin composition in which an aliphatic polyamide resin and an aromatic polyamide resin are simply mixed, or the aliphatic polyamide resin and the aromatic polyamide resin are molecularly bonded.

The metal-resin composite of Invention 6 comprises an aluminum alloy part covered with a surface having holes the openings of which have a number average inner diameter of 10 to 80 nm as measured under electron microscope observation, formed by anodizing; and a thermoplastic synthetic resin composition part, which is fixed by injection molding to the surface of the aluminum alloy part and which has a resin composition having as a main component two or more aromatic polyamides selected from a group of different types of aromatic polyamides.

The metal-resin composite of Invention 7 is the metal-resin composite of Invention 2 or 5, wherein the aliphatic polyamide resin is nylon 6 or nylon 66, and the aromatic polyamide resin is an aromatic nylon synthesized from phthalic acid and an aliphatic diamine.

The metal-resin composite of Invention 8 is the metal-resin composite of Invention 3 or 6, wherein the group of different types of aromatic polyamides is a group consisting of a polyamide from phthalic acid and hexamethylenediamine, a polyamide from isophthalic acid and hexamethylenediamine, and a polyamide from terephthalic acid and hexamethylenediamine.

The metal-resin composite of Invention 9 is the metal-resin composite of Inventions 1 to 8, wherein the thermoplastic synthetic resin composition comprises 1 to 200 parts by weight of a filler relative to 100 parts by weight of the resin composition.

The metal-resin composite of Invention 10 is the metal-resin composite of Invention 9, wherein the filler is one or more selected from glass fibers, carbon fibers, aramid fibers, calcium carbonate, magnesium carbonate, silica, talc, clay and glass powder.

The method for manufacturing a metal-resin composite of Invention 11 comprises the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and inserting the aluminum alloy part having undergone the dipping step into an injection mold, and injecting a thermoplastic synthetic resin composition of a resin composition having a polyamide resin as a main component and an impact resistance modifier as an auxiliary component, to mold a resin composition part and bond the resin composition part to the surface of the aluminum alloy part.

The method for manufacturing a metal-resin composite of Invention 12 comprises the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and inserting the aluminum alloy part having undergone the dipping step into an injection mold, and injecting a thermoplastic synthetic resin composition having a main resin composition in which an aliphatic polyamide resin and an aromatic polyamide resin are simply mixed, or the aliphatic polyamide resin and the aromatic polyamide resin are molecularly bonded, to mold a resin composition part and bond the resin composition part to the surface of the aluminum alloy part.

The method for manufacturing a metal-resin composite of Invention 13 comprises the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and inserting the aluminum alloy part having undergone the dipping step into an injection mold, and injecting a thermoplastic synthetic resin composition of a resin composition having as a main component two or more polyamides selected from the group consisting of a polyamide from phthalic acid and hexamethylenediamine, a polyamide from isophthalic acid and hexamethylenediamine, and a polyamide from terephthalic acid and hexamethylenediamine, to mold a resin composition part and bond the resin composition part to the surface of the aluminum alloy part.

The method for manufacturing a metal-resin composite of Invention 14 comprises the steps of: performing anodizing to obtain an aluminum alloy part surface covered with holes the openings of which have a number average inner diameter of 10 to 80 nm; and inserting the aluminum alloy part having undergone the anodizing step into an injection mold, and injecting a thermoplastic synthetic resin composition of a resin composition having a polyamide resin as a main component and an impact resistance modifier as an auxiliary component, to mold a resin composition part and bond the resin composition part to the surface of the aluminum alloy part.

The method for manufacturing a metal-resin composite of Invention 15 comprises the steps of: performing anodizing to obtain an aluminum alloy part surface covered with holes the openings of which have a number average inner diameter of 10 to 80 nm; and inserting the aluminum alloy part having undergone the anodizing step into an injection mold, and injecting a thermoplastic synthetic resin composition having a main resin composition in which an aliphatic polyamide resin and an aromatic polyamide resin are simply mixed, or the aliphatic polyamide resin and the aromatic polyamide resin are molecularly bonded, to mold a resin composition part and bond the resin composition part to the surface of the aluminum alloy part.

The method for manufacturing a metal-resin composite of Invention 16 comprises the steps of: performing anodizing to obtain an aluminum alloy part surface covered with holes the openings of which have a number average inner diameter of 10 to 80 nm; and inserting the aluminum alloy part having undergone the anodizing step into an injection mold, and injecting a thermoplastic synthetic resin composition of a resin composition having as a main component two or more polyamides selected from the group consisting of a polyamide from phthalic acid and hexamethylenediamine, a polyamide from isophthalic acid and hexamethylenediamine, and a polyamide from terephthalic acid and hexamethylenediamine, to mold a resin composition part and bond the resin composition part to the surface of the aluminum alloy part.

Figure 1:
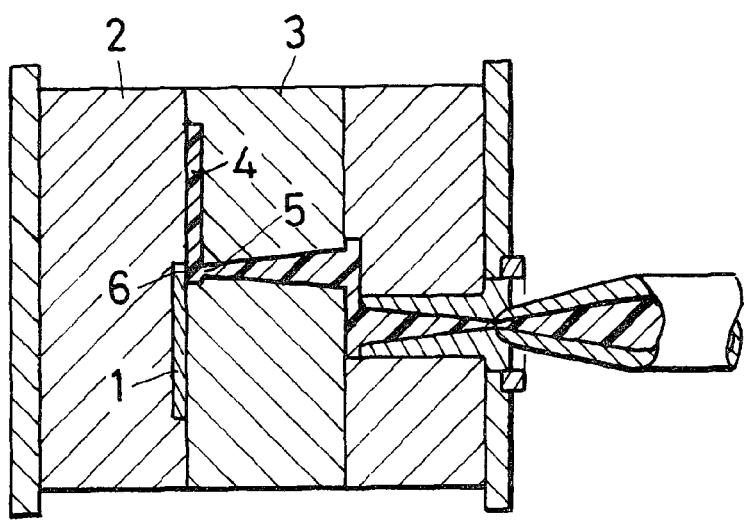
FIG. 1 is a cross-sectional diagram of an injection mold illustrating schematically the manufacture of a composite of an aluminum alloy part and a thermoplastic synthetic resin composition part having a polyamide resin as a main component.

1 . . . aluminum alloy part
2 . . . movable retainer plate
3 . . . fixed die plate
4 . . . thermoplastic synthetic resin composition part
5 . . . pin point gate
6 . . . bonding surface
7 . . . composite

BEST MODE FOR CARRYING OUT THE INVENTION

The various elements comprised in the above-described inventions are explained in detail next.

Aluminum Alloy Part

The material of the aluminum alloy part used in the present invention is an aluminum alloy. The aluminum alloy part is obtained by working an aluminum alloy material. Aluminum alloys are broadly divided into wrought alloys and cast alloys. Aluminum alloys are also broadly classified into non heat-treatable alloys, in which hardness and tensile strength are increased by work hardening alone, and heat-treatable alloys in which mechanical characteristics are improved through thermal treatment. Examples of aluminum alloys belonging to non heat-treatable alloys include, for instance, Al—Mg alloys, Al—Mn alloys, Al—Mg—Mn alloys and the like. Examples of aluminum alloys belonging to heat-treatable alloys include, for instance, Al—Cu—Mg alloys, Al—Zn—Mg alloys, Al—Mg—Si alloys, heat-resistant aluminum alloy and the like. Cast alloys are classified, in turn, into cast alloys for metal molds, sand molds, shell casting, die casting and the like.

The aluminum alloy used in the present invention includes many known alloys that are standardized under numbers A1000 to A7000 in accordance with JIS (Japanese Industrial Standards). The base material of the aluminum alloy part used in the present invention employs in principle such well-known aluminum alloys. Prior to working, the material shape of the aluminum alloy part used in the present invention may be that of a semi-processed aluminum material such as plates, rods, pipes, extrusion products, or casts. To obtain an aluminum alloy part out of such materials, the material is worked into a desired shape and structure through mechanical processing that may include, for instance, machining by cutting, milling, bending, drawing or the like, i.e. saw processing, milling, electron discharge processing, drilling, pressing, grinding, polishing and the like. A metal shaped product that makes up a portion of the part is processed by way of such mechanical processes into an insert that, through injection molding, yields a required shape and structural portions in the part.

No thick oxide film, hydroxide film or the like must be formed on the faces to be bonded of the aluminum alloy part having been worked into the required shape and structure. The aluminum alloy parts in which rust becomes apparent on the surface, after prolonged natural exposure, must have the surface thinned out by grinding, blasting or the like. Dirt other than rust, i.e. oily layers adhering during the metal processing operation and resin and the like, adhered during conveyance, are removed in the below-described degreasing process.

Pre-Treatment Process

The surface of the aluminum alloy part has adhered thereon processing oil, resins, chips and the like, and also small oil droplets and dirt after being processed by sandblasting or the like. Accordingly, the aluminum alloy part must be degreased and cleaned. The processed aluminum alloy part is ordinarily treated by being charged into solvent degreasing equipment for performing a known degreasing treatment. Alternatively, if oil adhesion is slight, the aluminum alloy part is subjected initially to an ordinary degreasing treatment that involves dipping for several minutes in an aqueous solution having dissolved therein a commercially available degreasing agent for aluminum alloys, followed by washing with water. To achieve a clean aluminum surface through further chemical whittling of the surface, a bath of an aqueous solution of dilute caustic soda, at a concentration of several %, is prepared to a temperature of about 40° C., and then the aluminum alloy part is dipped in such a bath of a caustic soda aqueous solution.

In a separate bath there is prepared, to a temperature of about 40° C., an acid aqueous solution such as a hydrochloric acid aqueous solution, a nitric acid aqueous solution, an aqueous solution of ammonium hydrogen fluoride or the like, to a concentration of several %. The acid solution employed differs depending on the type of aluminum alloy, and thus different aluminum alloys can be treated by preparing various aqueous solutions of such acids. The aluminum alloy shaped product, dipped in the caustic soda aqueous solution and washed with water, is then dipped in such acid solutions, followed by further washing with water, to complete thereby the pre-treatment process.

Dipping in an Aqueous Solution of a Water-Soluble Amine Compound

Once the above pre-treatment is over, the aluminum alloy part is dipped in an aqueous solution of a water-soluble amine compound. In this dipping treatment the aluminum alloy part is etched so as to form ultrafine irregularities on the surface of the aluminum alloy part, through dipping in an aqueous solution of one or more compounds selected from ammonia, hydrazine, and a water-soluble amine compound. Examples of the water-soluble amine compound include, for instance, methylamine, dimethylamine, trimethylamine, ethylamine, diethylamine, triethylamine, ethylenediamine, ethanolamine, allylamine, ethanolamine, diethanolamine, triethanolamine, aniline and the like.

Preferably, such aqueous solutions are adjusted to a weakly basic pH of 9 to 10. Upon dipping over an appropriate lapse of time, the surface of the aluminum alloy becomes etched into ultrafine irregularities and appears, under an electron microscope, to be covered with protrusions and recesses having diameters from 10 to 100 nm. When using a water-soluble amine, or an aqueous solution of hydrazine, the aqueous solution can be used at a concentration of 1% to 30%, from room temperature to 70° C., and from 0.5 minutes to about a dozen minutes. When using an aqueous ammonia solution, the latter can be used at a concentration of about 20%, at room temperature, and from about a dozen minutes to several tens of minutes of dipping time. After dipping, the aluminum alloy part is washed with water and is dried under warm air. The surface of the aluminum alloy subjected to the above-described dipping treatment is covered with microscopic recesses having an average inner diameter of 10 to 80 nm as observed under an electron microscope at 100,000 magnifications. The size of the recess inner diameter is explained in detail next. In the present invention, the number-average inner diameter denotes the quotient obtained by dividing the total sum of all measured diameters of recesses observable in a section of an electron micrograph, for instance within a unit square shape in a 200 nm rectangle, by the number of recesses measured therein.

The inventors found no aluminum alloy part surface covered with such ultrafine recesses for a recess inner diameter smaller than 10 nm, even after numerous etching experiments using aqueous solutions of water-soluble amine compounds. In the below-described anodizing, all the experiments carried out by the inventors yielded likewise pore openings having an inner diameter no smaller than 10 nm. In surface observations employing a type of electron microscope (SEM type) having the highest resolution commercially available in Japan, areas of resolution of 5 nm or less are hard to observe distinctly owing to edge jittering. In short, although the invention can presumably be used as well for a recess inner diameter, and an opening inner diameter of anodizing pores, smaller than 10 nm, at the present stage this has not yet been conclusively confirmed. Accordingly, the recesses are explained for an inner diameter of 10 nm or more, which the inventors succeeded in observing clearly under the electron microscope, and which corresponds to the scope of the invention.

When upon dipping of the aluminum alloy part in an aqueous solution of a water-soluble amine compound there form recesses having a number-average inner diameter greater than 80 nm, the fixing strength of the manufactured metal-resin composite of the present invention becomes greatly impaired as a result. The reason for this is explained next. Specifically, the inventors observed the following, on the basis of electron micrographs, upon erosion of the surface of aluminum alloy parts through dipping in the above erosive aqueous solutions.

In an example of an A5052 aluminum alloy (JIS standard), for which the phenomenon is most conspicuous, a water-soluble amine aqueous solution is adjusted to a weakly basic pH 10, and then the aluminum alloy is dipped therein at a temperature of about 50° C. Recesses having an inner diameter of 20 to 40 nm form immediately, such that within about 1 minute the depth of the recesses is similar to the inner diameter thereof. Upon prolonged dipping, the recesses are further cut into a greater depth, leading to eventual eating into the peripheral edge portions that make up the recesses, further increasing thereby, in average, the inner diameter of the recesses.

An A5052 piece was dipped for about 20 minutes, and was then washed with water and dried. Under observation using an electron microscope, the recesses visible on the surface of the piece had become larger, to an inner diameter of about 100 nm. Upon more detailed observation of the interior of the recesses, however, there was revealed an intricate pattern of grooves and complex fine recesses, as if burrowed by earthworms. The results of the injection bonding experiments carried out by the inventors with the polyamide resin used in the present invention showed that bonding force (called "fixing force" in the present invention) drops rapidly upon reaching a boundary corresponding to a recess average inner diameter of 80 nm.

That is, in chemical etching resulting from dipping an A5052 aluminum alloy piece in a weakly basic aqueous solution, bonding force by injection bonding drops rapidly upon reaching a boundary corresponding to an average inner diameter of about 80 nm. The inventors conjecture that the reason for the rapid drop in bonding force that accompanies an increase in recess diameter is related to the above-described complex shape of the recess interior.

The polyamide resin used in the present invention infiltrates into the ultrafine recesses formed on the metal side during injection molding, under the molding conditions, such that the molten polyamide resin crystallizes after infiltration. Conversely, the composition added to the polyamide resin, the size of the ultrafine recesses, the injection molding conditions and so forth are adjusted and set in such a manner so as to elicit crystallization of the infiltrated fused polyamide resin.

When the diameter and depth of the recesses are ultrafine and the recesses cover innumerably the metal surface, the metal portion and the polyamide resin crystallizing after penetrating into the recesses become supported by virtue of innumerable anchor effects that are believed to give rise thereby to an extraordinarily strong bonding force. When the surface has recesses of a size of 80 nm or larger, the bonding force weakens as a clear consequence of the resin flow, resin crystallization and solidification dynamics that are thought to be involved. Specifically, when dipping is prolonged excessively so that the recess diameter exceeds 80 nm, even when dipping is directed at forming fine recesses having a diameter of several tens of nm on the aluminum alloy surface, there form extremely complex three-dimensional shapes, with, for instance, small recessed holes forming inside the above-described recesses, or with through-holes forming in all directions and in multiple layers.

A cross section of an aluminum alloy deeply eroded in such a way, sliced in a perpendicular direction, reveals the formation of a layer having shapes as if worm-eaten, on portions at a depth of 100 to 200 nm from the surface, giving rise, as it were, to a spongy layer in which cavities or through-holes are connected with one another. In short, prolonging etching so that the recess diameter increases up to of 80 nm causes the surface layer of the aluminum alloy piece to acquire a spongy layer constitution, which weakens the mechanical strength of the surface layer itself. When the surface is formed as a spongy layer, moreover, the injected resin cannot penetrate all the way to the back of the gaps formed by the holes or through-holes that intricately pockmark the metal surface.

That is because the resin beings to crystallize and solidify through cooling before penetrating all the way into the recesses. The injected resin can get into the spongy surface portions, but cannot penetrate all the way in. Therefore, upon breakage resulting from shear forces or from applying a load in the direction in which the resin delaminates from the aluminum alloy, after integration of the aluminum alloy and the resin, the resin portion, which is susceptible to mechanical stress, does not break. Instead, there breaks the spongy layer of the surface of the aluminum alloy, not yet filled with resin. As a result, this precludes achieving high bonding strength.

Aluminum Alloy, Anodizing Treatment

An explanation follows next on an instance where the shaped aluminum alloy part is subjected to an anodizing surface treatment. In anodizing, the aluminum alloy part is degreased using a commercially available aluminum degreasing agent and is washed with water to remove mechanical processing oil and/or fat. Thereafter, the surface of the aluminum alloy part is cleaned by way of a pre-treatment such as alkali etching, chemical polishing or the like, and then an aluminum oxide layer, having innumerable microscopic pores, is formed on the surface of the aluminum alloy part by electrolysis in an acidic aqueous solution. Standard alkali etching involves ordinarily dipping for ten seconds to several tens of seconds in a caustic soda aqueous solution, having a concentration of 10 to 20%, at 50 to 90° C., to dissolve the alloy surface, followed by washing with water and subsequent chemical polishing. Chemical polishing involves dipping for several seconds to about a dozen seconds in a high-concentration aqueous solution of an acid such as nitric acid, phosphoric acid, sulfuric acid or the like, at 80 to 100° C.

As a result of these processes, the aluminum alloy surface is whittled by several μm or more. In the subsequent anodizing, as is well known, the aluminum in the aluminum alloy, which functions as an anode, is oxidized through current conduction in a sulfuric acid aqueous solution having a concentration of about 10%, at 10 to 20° C., as a result of which the surface of the aluminum alloy becomes covered with a hard, strong aluminum oxide layer. Covering the surface of the aluminum alloy with a non-conductive aluminum oxide would arguably terminate oxidation at that time, since further current cannot pass, but in fact conduction persists until the thickness of the aluminum oxide layer reaches about 20 μm. That is because conduction takes place via innumerable pores, having diameters of about a dozen to several tens of nm, that are opened on the surface of the aluminum oxide layer. Such anodized products of aluminum or aluminum alloys having innumerable pores can be dyed by being dipped in an aqueous solution having a dye dissolved therein, whereupon the dye penetrates into the pores.

Dyed alumite is obtained by further treating such an anodized product, to seal the pores and prevent the dye from escaping. The portions at which the recesses and/or pores are opened are not metallic themselves, but provided that they comprise a metal oxide harder and stronger than metal, the present invention is also obviously effective therein, on account of its underlying principle. That is, dyeing and pore sealing are not carried out in the present invention. Drying of the anodized product having been washed with water after anodization is carried out at low temperature. An excessive temperature during drying may cause the aluminum oxide in openings to react with water and give rise to a hydroxide that may cause the openings to deform and seal the pores. The drying temperature ranges preferably from 60 to 70° C.

Thermoplastic Synthetic Resin Composition/Composition of the Resin Component (I)

An explanation follows next on the thermoplastic synthetic resin composition that is used. The polyamide resin used in the present invention is a polyamide having as a main constituent thereof an amino acid, a lactam or a diamine and a dicarboxylic acid. Representative examples of such main constituents include, for instance, amino acids such as 6-aminocaproic acid, 11-aminoundecanoic acid, as 12-aminododecanoic acid and paraaminomethylbenzoic acid; lactams such as ε-caprolactam and ω-laurolactam; aliphatic, alicyclic or aromatic diamines such as tetramethylenediamine, hexamethylenediamine, 1,5-pentanediamine, 2-methyl pentamethylenediamine, nonamethylenediamine, undecamethylenediamine, dodecamethylenediamine, 2,2,4-/2,4,4-trimethyl hexamethylenediamine, 5-methyl nonamethylenediamine, meta-xylylenediamine, para-xylylenediamine, 1,3-bis(aminomethyl)cyclohexane, 1,4-bis(aminomethyl)cyclohexane, 1-amino-3-aminomethyl 3,5,5-trimethylcyclohexane, bis(4-aminocyclohexyl)methane, bis(3-methyl-4-aminocyclohexyl)methane, 2,2-bis(4-aminocyclohexyl)propane, bis (aminopropyl)piperazine, and aminoethyl piperazine; and aliphatic, alicyclic or aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalate, 2,6-naphthalene dicarboxylic acid, hexahydroterephthalic acid and hexahydroisophthalic acid. In the present invention, nylon homopolymers or copolymers derived from the foregoing raw materials can be used singly or in mixtures.

Polyamide resins particularly useful in the present invention are polyamide resins excellent in thermal resistance and strength, having a melting point not lower than 150° C. Specific examples thereof include, for instance, polycaproamide (nylon 6), polyhexamethylene adipamide (nylon 66), polypentamethylene adipamide (nylon 56), polytetramethylene adipamide (nylon 46), polyhexamethylene sebacamide (nylon 610), polyhexamethylene dodecanamide (nylon 612), polyundecaneamide (nylon 11), polydodecane amide (nylon 12), polycaproamide/polyhexamethylene adipamide copolymers (nylon 6/66), polycaproamide/polyhexamethylene terephthalamide copolymers (nylon 6/6T), polyhexamethylene adipamide/polyhexamethylene isophthalamide copolymers (nylon 66/6I), polyhexamethylene terephthalamide/polyhexamethylene isophthalamide copolymers (nylon 6 T/6I), polyhexamethylene terephthalamide/polydodecane amide copolymers (nylon 6T/12), polyhexamethylene adipamide/polyhexamethylene terephthalamide/polyhexamethylene isophthalamide copolymers (nylon 66/6T/6I), polyhexamethylene adipamide/polyhexamethylene isophthalamide/polycaproamide copolymers (nylon 66/6I/6), polymetaxylylene adipamide (nylon MXD 6), polyhexamethylene terephthalamide/poly-2-methylpentamethylene-terephthalic-amide copolymers (nylon 6T/M5T), polynonamethyleneterephthalamide (nylon 9T), and mixtures thereof.

As the polyamide resin there can be used both aliphatic nylon and aromatic nylon. Nylon 66 and nylon 6 are preferred as aliphatic nylons. Preferred aromatic nylons are those synthesized from phthalic acid and hexamethylenediamine. In practice, it is also appropriate to use these polyamide resins as copolymers/mixtures in accordance with, for instance, the required moldability and compatibility. The thermoplastic synthetic resin composition used for injection molding is divided into three types. The first type involves compounding a polyamide resin as a main component, and an impact resistance modifier as an auxiliary component. The thermoplastic synthetic resin composition comprises preferably 70 to 95 parts by weight of polyamide resin and 5 to 20 parts by weight of impact resistance modifier, relative to 100 parts by weight of total resin component. Using an impact resistance modifier allows achieving a required bonding strength in the metal-resin composite. Herein, the impact resistance modifier denotes a component that improves impact resistance when alloyed with the polyamide resin. The impact resistance modifier may be, for instance, a (co)polymer obtained by polymerizing an olefin compound and/or a conjugated diene compound.

Examples of such (co)polymers include, for instance, ethylene copolymers, conjugated diene polymers, conjugated diene-aromatic vinyl hydrocarbon copolymers and the like. Herein, ethylene copolymers denote copolymers and multi-component polymers of ethylene and other monomers. Other monomers that copolymerize with ethylene include, for instance, monomers selected from among α-olefins having three or more carbon atoms, nonconjugated dienes, vinyl acetate, vinyl alcohol, α,β-unsaturated carboxylic acids and derivatives thereof.

Examples of α-olefins having three or more carbon atoms include, for instance, propylene, butene-1, pentene-1, 3-methylpentene-1, and octene-1, preferably propylene, butene-1. Examples of non-conjugated dienes include, for instance, norbornene compounds such as 5-methylidene-2-norbornene, 5-ethylidene-2-norbornene, 5-vinyl-norbornene, 5-propenyl-2-norbornene, 5-isopropenyl-2-norbornene, 5-crotyl-2-norbornene, 5-(2-methyl-2-butenyl)-2-norbornene, 5-(2-methyl-2-butenyl)-2-norbornene and 5-methyl-5-vinyl norbornene or the like; dicyclopentadiene, methyl tetrahydroindene, 4,7,8,9-tetrahydroindene, 1,5-cyclooctadiene, 1,4-hexadiene, isoprene, 6-methyl-1,5-heptadiene, 11-tridecadiene and the like, preferably 5-methylidene-2-norbornene, 5-ethylidene-2-norbornene, dicyclopentadiene, 1,4-hexadiene or the like. Examples of α-β-unsaturated carboxylic acids include, for instance, acrylic acid, methacrylic acid, ethacrylic acid, crotonic acid, maleic acid, fumaric acid, itaconic acid, citraconic acid, and butenedicarboxylic acid, while examples of derivatives thereof include, for instance, alkyl esters, aryl esters, glycidyl esters, acid anhydrides and imides.

The conjugated diene polymer denotes herein a polymer having as constituents thereof one or more of the above conjugated dienes, for instance a homopolymer such as 1,3-butadiene, or a copolymer of one or more monomers selected from 1,3-butadiene, isoprene (2-methyl-1,3-butadiene), 2,3-dimethyl-1,3-butadiene, and 1,3-pentadiene. Also, there can preferably be used a polymer in which part or the entirety of the unsaturated bonds of the polymer are reduced by hydrogenation.

The conjugated diene-aromatic vinyl hydrocarbon copolymer denotes herein a block copolymer or a random copolymer comprising a conjugated diene and an aromatic vinyl hydrocarbon. Examples of conjugated dienes that make up the conjugated diene-aromatic vinyl hydrocarbon copolymer include, for instance, the above monomers, preferably, in particular, 1,3-butadiene and isoprene. As the aromatic vinyl hydrocarbon there can be used, for instance, styrene, α-methyl styrene, o-methyl styrene, p-methyl styrene, 1,3-dimethyl styrene, vinyl naphthalene or the like, preferably styrene. Also, there can preferably be used a polymer in which part or the entirety of the unsaturated bonds of the conjugated diene-aromatic vinyl hydrocarbon copolymer, other than double bonds excluding the aromatic rings, are reduced by hydrogenation.

In order to control with precision the diameter of dispersed particles of the impact resistance modifier in the resin composition, there can be preferably used also (co)polymers obtained through graft polymerization or copolymerization of various unsaturated carboxylic acids and/or derivatives thereof, and vinyl monomers. Preferably, the amount of unsaturated carboxylic acids and/or derivatives thereof and vinyl monomers for a grafting reaction or copolymerization ranges from 0.01 to 20.00 wt % relative to the impact resistance modifier. Examples of unsaturated carboxylic acids used in a grafting reaction or copolymerization include, for instance, acrylic acid, methacrylic acid, ethacrylic acid, crotonic acid, maleic acid, fumaric acid, itaconic acid, citraconic acid, and butenedicarboxylic acid.

Examples of derivatives of such unsaturated carboxylic acids include, for instance, alkyl esters, glycidyl esters, esters having di- or tri-alkoxy silyl groups, acid anhydrides and imides. Preferred among them are glycidyl esters, esters of unsaturated carboxylic acids having di- or tri-alkoxy silyl groups, acid anhydrides, and imides.

Examples of unsaturated carboxylic acids or derivatives thereof that can be used, include, for instance, maleic acid, fumaric acid, glycidyl acrylate, glycidyl methacrylate, diglycidyl itaconate, diglycidyl citraconate, diglycidyl butene dicarboxylate, monoglycidyl butene dicarboxylate, maleic anhydride, itaconic anhydride, citraconic anhydride, maleimide, itaconimide, citraconimide or the like, preferably, in particular, glycidyl methacrylate, maleic anhydride, itaconic anhydride, and maleimide.

Examples of the vinyl monomers include aromatic vinyl compounds such as styrene or the like; vinyl cyanide compounds such as acrylonitrile or the like; vinyl silane compounds such as vinyltrimethoxysilane or the like Two or more of these unsaturated carboxylic acids, derivatives thereof or vinyl monomers may be used in combination. Known methods can be used for grafting the (co)polymers with any of these unsaturated carboxylic acids, derivatives thereof or vinyl monomers.

A polyamide elastomer or polyester elastomer can also be used. The impact resistance modifiers can be used in combinations of two or more. Specific examples of such impact resistance modifiers include, for instance, ethylene/propylene copolymers, ethylene/butene-1 copolymers, ethylene/propylene/dicyclopentadiene copolymers, ethylene/propylene/5-ethylidene-2-norbornene copolymers, unhydrogenated or hydrogenated styrene/isoprene/styrene triblock copolymers, unhydrogenated or hydrogenated styrene/butadiene/styrene triblock copolymers, ethylene/methacrylic acid copolymers, copolymers in which part or the entirety of the carboxylic acid moieties in the copolymers form salts with sodium, lithium, potassium, zinc, or calcium; ethylene/methyl acrylate copolymers, ethylene/methyl methacrylate copolymers, ethylene/ethyl methacrylate copolymers, ethylene/ethyl acrylate-g-maleic anhydride copolymers (g denotes "grafted", likewise hereinafter), ethylene/methyl methacrylate-g-maleic anhydride copolymers, ethylene/ethyl acrylate-g-maleimide copolymers, ethylene/ethyl acrylate-g-N-phenylmaleimide copolymers, and partial saponification products of these copolymers, ethylene/glycidyl methacrylate copolymers, ethylene/vinyl acetate/glycidyl methacrylate copolymers, ethylene/methyl methacrylate/glycidyl methacrylate copolymers, ethylene/glycidyl acrylate copolymers, ethylene/vinyl acetate/glycidyl acrylate copolymers, ethylene/glycidyl ether copolymers, ethylene/propylene-g-maleic anhydride copolymers, ethylene/butene-1-g-maleic anhydride copolymers, ethylene/propylene/1,4-hexadien-g-maleic anhydride copolymers, ethylene/propylene/dycyclopentadien-g-maleic anhydride copolymers, ethylene/propylene/2,5-norbornadien-g-maleic anhydride copolymers, ethylene/propylene-g-N-phenylmaleimide copolymers, ethylene/buten-1-g-N-phenylmaleimide copolymers, hydrogenated styrene/butadiene/styrene-g-maleic anhydride copolymers, hydrogenated styrene/isoprene/styrene-g-maleic anhydride copolymers, ethylene/buten-1-g-glycidyl methacrylate copolymers, ethylene/propylene/1,4-hexadien-g-glycidyl methacrylate copolymers, ethylene/propylene/dicyclopentadien-g-glycidyl methacrylate copolymers, hydrogenated styrene/butadiene/styrene-g-glycidyl methacrylate copolymers, nylon 12/polytetramethylene glycol copolymers, nylon 12/polytrimethylene glycol copolymers, polybutylene terephthalate/polytetramethylene glycol copolymers, polybutylene terephthalate/polytrimethyl glycol copolymers or the like.

More preferred among these are ethylene/methacrylic acid copolymers and copolymers in which part or the entirety of the carboxylic acid moieties in the copolymers form salts with sodium, lithium, potassium, zinc, or calcium, more preferably, ethylene/propylene-g-maleic anhydride copolymers, ethylene/buten-1-g-maleic anhydride copolymers, hydrogenated styrene/butadiene/styrene-g-maleic anhydride copolymers, and in particular, ethylene/methacrylic acid copolymers and copolymers in which part or the entirety of the carboxylic acid moieties in the copolymers form salts with sodium, lithium, potassium, zinc, or calcium, ethylene/propylene-g-maleic anhydride copolymers, and ethylene/buten-1-g-maleic anhydride copolymers.

Besides the impact resistance modifier, adding a polyfunctional isocyanate compound and/or an epoxy resin has often the effect of increasing injection bonding strength, as these compounds are found to promote compatibility. Specifically, the polyfunctional isocyanate compound is blended preferably in an amount of 0.1 to 6.0 parts by weight, and/or the epoxy resin in an amount of 1 to 25 parts by weight, relative to 100 parts by weight of total resin component.

A commercially available blocked or unblocked polyfunctional isocyanate compound can be used as the polyfunctional isocyanate compound. Examples of polyfunctional unblocked isocyanate compounds include, for instance, 4,4'-diphenylmethane diisocyanate, 4,4'-diphenylpropane diisocyanate, toluene diisocyanate, phenylene diisocyanate, bis(4-isocyanatephenyl)sulfone or the like.

Examples of polyfunctional blocked isocyanate compounds include, for instance, polyfunctional blocked isocyanate compounds having two or more isocyanate groups in the molecule, the isocyanate groups being made inactive at room temperature through a reaction with a volatile active hydrogen compound. The type of the polyfunctional blocked isocyanate compound, which is not particularly limited, has ordinarily a structure in which the isocyanate group is masked by way of blocking agents such as alcohols, phenols, ε caprolactam, oximes, and active methylene compounds. As the polyfunctional blocked isocyanate there can be used, for instance "Takenate" (by Mitsui Chemicals Polyurethane Inc. Tokyo, Japan) or the like.

As the epoxy resin there can be used an ordinary known epoxy resin of bisphenol A type, a cresol novolac type or the like. Examples of bisphenol A-type epoxy resins include, for instance, "Epicoat" (by Japan Epoxy Resin Co., Ltd.) or the like, while examples of cresol novolac-type epoxy resins include, for instance, "Epiclon" (by Dainippon Ink & Chemicals, Inc., Tokyo, Japan) or the like.

Thermoplastic Synthetic Resin Composition/Composition of the Resin Component (II)

When using as the polyamide resin a main resin composition obtained through simple mixing of an aliphatic polyamide resin and an aromatic polyamide resin, the amount of aliphatic polyamide resin is preferably 10 to 90 parts by weight, and the amount of aromatic polyamide resin is preferably 90 to 10 parts by weight, relative to 100 parts by weight of total resin component. More preferably, the amount of aliphatic polyamide resin is 70 to 90 parts by weight, and the amount of aromatic polyamide resin is 30 to 10 parts by weight. Although both have high crystallinity, it is found that mixed-in foreign matter causes the overall crystallization rate to decrease. Examples of aliphatic polyamide resins include, for instance, polycaproamide (nylon 6), polyhexamethylene adipamide (nylon 66), polypentamethylene adipamide (nylon 56), polytetramethylene adipamide (nylon 46), polyhexamethylene sebacamide (nylon 610), polyhexamethylene dodecanamide (nylon 612), polyundecane amide (nylon 11), polydodecane amide (nylon 12) and mixtures thereof.

Examples of aromatic polyamide resins include, for instance, aromatic nylon (nylon 6I) synthesized from isophthalic acid and hexamethylenediamine, aromatic nylon (nylon 6T) synthesized from terephthalic acid and hexamethylenediamine, polymetaxylylene adipamide (nylon MXD 6), polynonamethylene terephthalamide (nylon 9T) and mixtures thereof. The above aliphatic polyamide resins and aromatic polyamide resins, mixed at the above proportions, can be used by being melt kneaded. Pellets comprising the resins can also be used as dry pellets.

When using as a main resin composition a composition in which the aliphatic polyamide resin and the aromatic polyamide resin are bonded molecularly, there is employed a block polymer of an aliphatic polyamide resin component an aromatic polyamide resin component, ordinarily a so-called copolynylon (copolymer). As the aliphatic polyamide resin component to be copolymerized there can be used a component comprising the above aliphatic polyamide resins, preferably, nylon 6, nylon 66, nylon 46, nylon 610, nylon 612, nylon 12, and more preferably, nylon 6 or nylon 66. As the aromatic polyamide resin component to be copolymerized there can be used a component comprising the above aromatic polyamide resins.

Preferred copolynylons include, for instance, polycaproamide/polyhexamethylene isophthalamide copolymers (nylon 6/6I), polycaproamide/polyhexamethylene terephthalamide copolymers (nylon 6/6T), polyhexamethylene adipamide/polyhexamethylene isophthalamide copolymers (nylon 66/6I), polyhexamethylene adipamide/polyhexamethylene terephthalamide copolymers (nylon 66/6T), polyhexamethylene terephthalamide/polydodecane amide copolymers (nylon 6T/12), polyhexamethylene adipamide/polyhexamethylene terephthalamide/polyhexamethylene isophthalamide copolymers (nylon 66/6T/6I), polyhexamethylene adipamide/polyhexamethylene isophthalamide/polycaproamide copolymers (nylon 66/6I/6) or the like.

Preferred copolynylons include, for instance, those having a 6I nylon component. Particularly preferred copolynylons include a tripolymer (nylon 66/6I/6 resin) comprising a hexamethylene adipamide component (nylon 66 component) a hexamethylene isophthalamide component (nylon 6I component), and a caproamide component (nylon 6 component), obtained by heating and polymerizing, in a polymerization tank, an equimolar salt of hexamethylenediamine and adipic acid, an equimolar salt of hexamethylenediamine and isophthalic acid, and ε caprolactam. The copolymerization ratio corresponds to the ratio of blending raw materials. A preferred copolymerization ratio of repetitive structural units is 65 to 90 wt % of nylon 66 component, 5 to 30 wt % of nylon 6I component and 1 to 14 wt %, more preferably 2 to 12 wt % of nylon 6 component. At the same time, there is preferably satisfied a copolymerization ratio of nylon 6I component/nylon 6 component no smaller than 1.0. Such a copolymerization ratio can be achieved by adjusting the proportions of raw materials during the manufacture of the copolymers.

Preferably, there can also be used a tripolymer (nylon 66/6T/6I resin) comprising a hexamethylene adipamide component (nylon 66 component), a hexamethylene terephthalamide component (nylon 6T component) and a hexamethylene isophthalamide component (nylon 6I component), obtained by heating and polymerizing, in a polymerization vessel, an equimolar salt of hexamethylenediamine and adipic acid, an equimolar salt of hexamethylenediamine and terephthalic acid, and an equimolar salt of hexamethylenediamine and isophthalic acid. The copolymerization ratio corresponds to the ratio of blending raw materials. A preferred copolymerization ratio of repetitive structural units is 5 to 15 wt % of nylon 66 component, 55 to 65 wt % of nylon 6T component, and 20 to 30 wt % of nylon 6I component.

Preferably, there can also be used a tripolymer (nylon 6/6T/6I resin) comprising a caproamide component (nylon 6 component), a hexamethylene terephthalamide component (nylon 6T component), and a hexamethylene isophthalamide component (nylon 6I component), obtained by heating and polymerizing, in a polymerization vessel, an equimolar salt of ε-caprolactam and benzoic acid, an equimolar salt of hexamethylenediamine and terephthalic acid, and an equimolar salt of hexamethylenediamine and isophthalic acid. The copolymerization ratio corresponds to the ratio of blending raw materials. A preferred copolymerization ratio of repetitive structural units is 5 to 15 wt % of nylon 6 component, 55 to 65 wt % of nylon 6T component, and 20 to 30 wt % of nylon 6I component.

Using a copolynylon having such copolymerization ratios allows obtaining solidification characteristics suitable for adherence to Al, without impairment of mechanical characteristics or heat resistance characteristics. Loss of mechanical characteristics on account of moisture absorption can be curbed with a content of nylon 6 of, preferably, 1 to 10 parts by weight, more preferably, of 3 to 8 parts by weight. Loss of mechanical characteristics on account of moisture absorption can be further curbed when the copolymerization ratio of nylon 6I to nylon 6 is no smaller than 1.0. The copolynylon used in the present invention has preferably a viscosity number of 70 to 130 ml/g, more preferably of 75 to 110 ml/g, as measured in accordance with ISO307. Using a copolynylon falling within the above ranges allows obtaining a thermoplastic synthetic resin composition suitable for the present invention, having good adherence to aluminum without loss of mechanical characteristics.

Thermoplastic Synthetic Resin Composition/Composition of the Resin Component (III)

In the present invention there can also be used a thermoplastic synthetic resin composition of a resin composition having as a main component two or more aromatic polyamides selected from a group of different types of aromatic polyamide resins. In this case, the two or more aromatic polyamides may be simply mixed or may be bonded molecularly. When using simply mixed aromatic polyamides, the main component may comprise two or more of the above-described aromatic polyamide resins. Preferably, there can be used two or more aromatic polyamides selected from the group consisting of a polyamide resin of phthalic acid and hexamethylenediamine, a polyamide resin (nylon 6I) of isophthalic acid and hexamethylenediamine, and a polyamide resin (nylon 6T) of terephthalic acid and hexamethylenediamine, and more preferably, a combination of nylon 6T and nylon 6I.

In the latter case, the amount of nylon 6T is preferably 10 to 90 parts by weight, and the amount of nylon 6I is 10 to 90 parts by weight, relative to a total 100 parts by weight of resin component. More preferably, the amount of nylon 6T is 50 to 80 parts by weight, and the amount of nylon 6I is 20 to 50 parts by weight. The above ranges afford a thermoplastic synthetic resin composition having excellent heat resistance characteristics and appropriate adherence to aluminum. When using two or more molecularly bonded aromatic polyamides, there is preferably employed a copolynylon having the same ratios as those used in the case of simple mixing.

Thermoplastic Synthetic Resin Composition/Filler

With a view to adjusting the difference in coefficient of linear expansion between the aluminum alloy part and the resin composition part, and enhancing the mechanical strength of the resin composition part, the composite of the present invention is preferably a resin composition further comprising a filler in an amount of 1 to 200 parts by weight, more preferably 10 to 150 parts by weight, relative to 100 parts by weight of total resin component.

As the filler there can be used, for instance, fibrous fillers, granular fillers, lamellar fillers and the like. Examples of fibrous fillers include, for instance, glass fibers, carbon fibers, aramide fibers and the like. Specific examples of glass fibers include, for instance, chopped strand fibers having an average fiber diameter of 6 to 14 μm. Examples of lamellar and granular fillers include, for instance, calcium carbonate, mica, glass flakes, glass balloons, magnesium carbonate, silica, talc, clay, and crushed products of carbon fibers or aramide fibers.

Even in the absence of a filler, a very strong force is required to remove a resin molded product solidly bonded to a metal. When a molded composite is subjected to a heat cycle test, however, resin systems comprising no filler exhibit a rapid loss of bonding strength as cycles add up. Two factors underlie this phenomenon. One factor is the large difference between the coefficients of linear expansion of the metal shaped product and the thermoplastic synthetic resin composition. For instance, although the coefficient of linear expansion of aluminum alloy is high among metals, it is still fairly smaller than that of thermoplastic synthetic resins. A filler lowers the coefficient of linear expansion of the thermoplastic synthetic resin composition, bringing it close to the coefficient of linear expansion of aluminum alloys, of about $2.5 \times 10^{-5}$° $C.^{-1}$.

The coefficient of linear expansion of the resin can be brought closer to that of the aluminum alloy or the like by selecting the type and amount of the filler. For instance, the coefficient of linear expansion can be lowered to 2 to $3 \times 10^{-5}$° $C.^{-1}$ for nylon 66 comprising 40 to 50% of glass fibers. The second factor is the relationship between the cooling shrinkage of the metal shaped product after insert molding and the mold shrinkage of the thermoplastic synthetic resin composition. The mold shrinkage of nylon 66 comprising no filler is 0.6 to 2.5%. Meanwhile, the cooling shrinkage of an aluminum alloy, for instance upon cooling by about 100° C. down to room temperature after injection, is roughly 0.2%, i.e. a difference far smaller than the mold shrinkage of resins. As resin shrinkage progresses with time, after demolding from the injection mold, internal strain develops in the interface, so that slight shocks may give rise to interfacial failure and delamination. The mold shrinkage of nylon 66 can be lowered to about 0.4 to 0.6% by mixing in 40 to 50% of glass fibers. Such mold shrinkage is still fairly larger than the shrinkage of the aluminum alloy, and thus substantial internal strain remains at the bonding surface after bonding.

Therefore, molding shrinkage remains unsatisfactory even with such a substantial filler content. Accordingly, a first design requirement mandates that the aluminum alloy and the polyamide composition should be injection-molded in such a way that substantial inner strain is unlikely to remain at the bonding surface. This requires, however, a specific method for verifying whether or not the design results in a finished article worthy of use. Such a method turns out to be surprisingly simple. Specifically, if strength upon breakage, after standing several days following actual injection bonding, is tentatively satisfactory, then the bonding strength arguably outstrips the forces that would give rise to breakage on account of internal strain. To eliminate internal strain in such an integrated product, the resin is softened by heating (annealing) for about 1 hour at 150 to 170° C., within several days after injection bonding. If the expected strength is obtained in a fracture test of the annealed integrated product, then the design is a successful one. Such strength can be preserved for a long time provided that the resin portion does not expand through swelling on account of water absorption by the polyamide.

Molding/Injection Molding

Injection molding involves preparing an injection mold, opening a movable die, inserting the above-described aluminum alloy shaped product in one movable die, closing the movable die, injecting the above-described thermoplastic synthetic resin composition, opening the movable die, and demolding the molded product. An explanation follows next on the injection conditions of the thermoplastic synthetic resin composition during molding. Although high mold temperature and high injection temperature yield good results, a sufficient bonding effect can be elicited under conditions substantially identical to those during ordinary injection molding of the above-described thermoplastic synthetic resin composition, without unduly increasing mold and injection temperatures. To increase bonding strength, it is effective rather to increase slightly the mold temperature above the mold temperature ordinary used during molding of the resin alone. In the experience of the inventors, a mold temperature of 140 to 160° C. results in a highly stable bonding strength. Therefore, the injection mold should be constructed for use at such temperatures.

Effect

The present invention allows solidly bonding an aluminum alloy shaped product and a polyamide-type resin composition in accordance with a method based on injection molding using inserts. That result is made possible by treating a metal shaped product in accordance with various methods, to cover the surface of the metal shaped product with ultrafine recesses and/or pore openings, and by imparting a polyamide resin with special characteristics by way of a compounding procedure. These two measures allow bonding a metal and a resin molded portion by inserting a metal alloy shaped product, having been subjected to a surface treatment, in an injection mold, and by injecting then a polyamide-type resin composition into the injection mold. The present invention is thus arguably useful for weight reduction of electronic devices and household appliances, weight reduction of on-board devices and parts, and in parts and chassis in many other fields.

As explained in detail above, the present invention enables a polyamide-type resin composition and an aluminum alloy shaped product to be solidly injection molded, such that the obtained integrated article does not delaminate readily. Therefore, the present invention allows manufacturing parts and structures of chassis of various devices, with a great degree of freedom, in terms of shape as well as structural mechanical strength. The present invention is useful thus for reducing weight, and streamlining device manufacturing process, in chassis, parts and structures manufactured in accordance with the present invention.

Examples of the present invention are explained in detail below in place of experimental examples. An explanation follows first on a method for manufacturing a copolymerized polyamide (block polymer) used in the examples, and a method for measuring the viscosity number thereof.

Reference Example 1

Method for Manufacturing a Copolymerized Polyamide (Block Polymer)

Raw materials such as an equimolar salt of an acid and a diamine as the raw material of a copolymerized polyamide were charged, to respective mass ratios, in a reactor. Pure water was added in an equivalent amount to the total amount of charged resin component, and then the polymerization tank was purged with $N_2$, after which heating was started, under stirring, to let the reaction proceed while adjusting the tank pressure to a maximum 20 kg/cm$^2$, to an end-point temperature of 270° C. The polymer discharged into a water bath was pelletized with a strand cutter. The obtained pellets were treated for 20 hours in hot water at 95° C., and the unreacted monomers and low polymers were extracted and removed. After extraction, the pellets were dried for no fewer than 50 hours at 80° C.

Reference Example 2

Viscosity Number Measurement Method

The viscosity number was measured in 96% sulfuric acid in accordance with the ISO 307 standard.

Example 1

A commercially available A5052 aluminum alloy plate having a thickness of 1.6 mm was purchased and was cut into 18 mm×45 mm rectangular pieces. Holes of 2 mm φ were opened at the ends of the aluminum alloy pieces using a press. A copper wire covered with vinyl chloride resin was prepared. The copper wire was threaded through the holes of 10 alloy pieces, and the middle was bent in such a manner that the 10 alloy pieces were suspended without sticking or coming into contact with one another. A bath comprising 15% of an aluminum degreasing agent (NE-6 by Meltex Inc., Tokyo, Japan) was prepared, to a solution temperature of 75° C. The alloy pieces were dipped in this degreasing agent aqueous solution for 5 minutes, and were then washed with water. In another bath there was prepared next an aqueous solution of 1% hydrochloric acid, to a solution temperature of 40° C. The aluminum alloy pieces were dipped in this bath for 1 minute, followed by washing with water.

In another bath there was prepared next an aqueous solution of 1% caustic soda, to a solution temperature of 40° C. The aluminum alloy pieces were dipped in this bath for 1 minute, followed by washing with water. In another bath there was prepared next an aqueous solution of 1% hydrochloric acid, to a solution temperature of 40° C. The aluminum alloy pieces were dipped in this bath for 1 minute, followed by washing with water. The alloy pieces were next dipped for 1 minute in an aqueous solution of 3.5% hydrazine monohydrate at 60° C., followed by washing with water, and drying for 20 minutes in a warm air drier at 60° C. The aluminum alloy pieces were removed from the copper wire, were wrapped in aluminum foil, and were then sealed in polyethylene bags. On the next day the aluminum alloy pieces were observed under an electron microscope (S-4800, by Hitachi, Tokyo, Japan) at 100,000 magnifications, which revealed that the entire surface of the pieces was covered with 20 to 40 nm-diameter recesses, having a number average inner diameter of 25 nm.

Meanwhile, a block polymer, comprising 77 wt % of a nylon 66 component from adipic acid and hexamethylenediamine, 17 wt % of a 6I nylon component from isophthalic acid and hexamethylenediamine, and 6 wt % of a nylon 6 component, was prepared in accordance with the method of Reference example 1. The obtained synthetic resin exhibited a viscosity number of 85 ml/g as measured in accordance with the method of Reference example 2. The melt viscosity was 380 poise, measured at a temperature of 270° C., under a load of 98.1 N (10 kgf), using a flow tester (CFT-500 by Shimadzu, Kyoto, Japan). A pelletized polyamide resin composition was obtained by melt kneading the resin, at a cylinder temperature of 280° C., in a biaxial extruder (TEM-35B, by Toshiba Machine Co., Ltd.), while feeding thereto, via a side feeder, glass fibers (RES03-TP91, by Nippon Sheet Glass Co., Ltd.) to an addition amount of 50 wt %.

Figure 2:
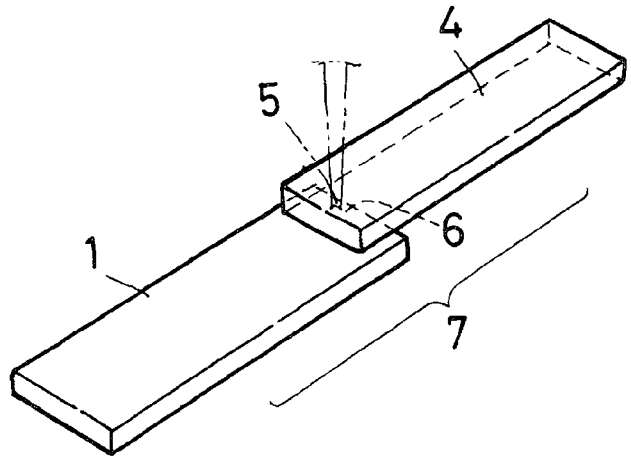
FIG. 2 is an external view diagram illustrating schematically a single composite of an aluminum alloy part and a thermoplastic synthetic resin composition part having a polyamide resin as a main component.

The aluminum alloy pieces were kept for two days, after which they were taken out and inserted in an injection mold while handled with gloves, to prevent adhesion of oil or the like. FIG. 1 illustrates a schematic diagram of the injection mold. In the figure, the reference numeral 1 denotes an aluminum alloy piece, 2 denotes a movable retainer plate, 3 denotes a fixed die plate, 4 denotes a cavity into which the resin is injected, 5 denotes a pin-point gate, and 6 denotes a bonding surface. Successful injection bonding results in the integrated product illustrated in FIG. 2. In FIG. 2, the reference numeral 1 denotes the aluminum alloy piece (1.6 mm×45.0 mm×18.0 mm), 4 denotes a resin portion (3 mm×50 mm×10 mm), 5 the pin-point gate, and 6 the bonding surface (5 mm×10 mm). The area of the bonding surface was 0.5 cm$^2$. The integrated article illustrated in FIG. 2 was obtained by closing the dies and injecting the above nylon resin composition comprising 50% of glass fibers.

Injection temperature was 260° C., and mold temperature was 140° C. About 2 hours after injection bonding, the integrated article was placed and left to stand in a warm air drier at 150° C. for 1 hour, and was then left to cool. Two days later, the 10 samples were all subjected to a tensile fracture test in a tensile tester. This test allowed measuring shear fracture forces. The results showed an averaged shear fracture force of 26.0 MPa (265 kgf/cm$^2$).

Comparative Example 1

An experiment was carried out in exactly the same way as in Example 1, but using herein, as the resin composition, nylon 66 (Amilan CM3001G45, by Toray Industries, Inc., Tokyo, Japan) comprising 45% of glass fibers. The shear fracture force of the obtained integrated articles of aluminum alloy pieces and nylon 66 resin was 18.9 MPa (193 kgf/cm$^2$) in average, i.e. lower than in Example 1.

Example 2

A blend of 63 wt % of nylon 6 (CM1010, by Toray Industries, Inc.) and 7 wt % of an ionomer of an ethylene-methacrylic acid copolymer (Himilan 1706, by DuPont-Mitsui Polychemical Co., Ltd., Tokyo, Japan) was prepared beforehand, and then a pelletized polyamide/elastomer resin composition was obtained by melt kneading the blend, at a cylinder temperature of 250° C., in a biaxial extruder (TEM-35, by Toshiba Machine Co., Ltd., Shizuoka, Japan), while feeding thereto, via a side feeder, glass fibers (RES03-TP91, by Nippon Sheet Glass Co., Ltd.) to an addition amount of 30 wt %. The obtained compound resin composition of polyamide/elastomer was dried for 2 hours at 175° C. An experiment completely identical to that of Example 1 was then carried out using the resin composition. Samples of integrated products with aluminum alloy pieces were obtained, and were then subjected to a tensile fracture test to measure their shear fracture force, which was an average 24.6 MPa (251 kgf/cm$^2$) for the 10 samples.

Comparative Example 2

An experiment was carried out in exactly the same way as in Example 2, but using herein, as the resin composition, nylon 6 (Amilan CM1011G30, by Toray Industries, Inc.) comprising 30% of glass fibers. The shear fracture force of the obtained integrated articles of aluminum alloy pieces and nylon 6 resin was 20.1 MPa (205 kgf/cm$^2$) in average, which was remarkably lower than that of Example 2.

Example 3

A polymer, comprising 12 wt % of a nylon 66 component from adipic acid and hexamethylenediamine, 62 wt % of a nylon 6T component from terephthalic acid and hexamethylenediamine, and 26 wt % of a nylon 6I component from isophthalic acid and hexamethylenediamine, was prepared in accordance with the method of Reference example 1. The obtained synthetic resin exhibited a viscosity number of 85 ml/g as measured in accordance with the method of Reference example 2. The melt viscosity was 360 poise, measured at a temperature of 300° C., under a load of 10 kg, using a flow tester (CFT-500 by Shimadzu). A pelletized polyamide resin composition was obtained by melt kneading the resin, at a cylinder temperature of 300° C., in a biaxial extruder (TEM-35B, by Toshiba Machine Co., Ltd.), while feeding thereto, via a side feeder, glass fibers (RES03-TP91, by Nippon Sheet Glass Co., Ltd., Tokyo, Japan) to an addition amount of 30 wt %.

An experiment completely identical to that of Example 1 was then carried out, but using herein this aromatic nylon resin composition and at an injection temperature of 280° C. Samples of integrated products with aluminum alloy pieces were obtained, and were then subjected to a tensile fracture test to measure their shear fracture force, which was an average 25.5 Mpa (260 kgf/cm$^2$) for the 10 samples.

Example 4

A polymer, comprising 70 wt % of a nylon 6T component from terephthalic acid and hexamethylenediamine, and 30 wt % of a nylon 6I component from isophthalic acid and hexamethylenediamine, was prepared in accordance with the method of Reference example 1. The obtained synthetic resin exhibited a viscosity number of 90 ml/g as measured in accordance with the method of Reference example 2. The melt viscosity was 380 poise, measured at a temperature of 300° C., under a load of 10 kg, using a flow tester (CFT-500 by Shimadzu). A pelletized polyamide resin composition was obtained by melt kneading the resin, at a cylinder temperature of 300° C., in a biaxial extruder (TEM-35B, by Toshiba Machine Co., Ltd.), while feeding thereto, via a side feeder, glass fibers (RES03-TP91, by Nippon Sheet Glass Co., Ltd.) to an addition amount of 30 wt %.

An experiment completely identical to that of Example 1 was then carried out, but using herein this aromatic nylon resin composition and at an injection temperature of 290° C. Samples of integrated products with aluminum alloy pieces were obtained, and were then subjected to a tensile fracture test to measure their shear fracture force, which was an average 24.0 Mpa (245 kgf/cm$^2$) for the 10 samples.

Example 5

A commercially available A5052 aluminum alloy plate having a thickness of 1.6 mm was cut into 18 mm×45 mm rectangular pieces, to obtain aluminum alloy plates as the metal plate 1. Holes were opened at the ends of the aluminum alloy plates, a vinyl resin-coated copper wire was threaded through a dozen plates, and then the copper wire was bent to suspend simultaneously all the aluminum alloy plates in such a manner so as to prevent the latter from becoming stacked on one another. A commercially available degreasing agent for aluminum alloys (NE-6 by Meltex Inc.) was added, in an amount of 7.5%, to water in a bath, followed by thermal dissolution at 75° C. The above aluminum alloy plates were then dipped for 5 minutes and were thoroughly washed with water.

In another bath there was prepared next an aqueous solution of 10% caustic soda, at 50° C., into which the aluminum alloy plates were dipped for 0.5 minutes, followed by thorough washing with water. In another bath there was prepared next an 60% nitric acid solution at 90° C., into which the aluminum alloy plates were dipped for 15 seconds, followed by thorough washing with water. In another bath there was prepared next a 5% sulfuric acid solution at 20° C. The anode of a DC power supply device (ASR3SD-150-500, by Chuo Seisakusho Ltd.) was connected to holes of the above-described aluminum alloy, the cathode was connected to a lead plate in the bath, and then anodizing was carried out, under constant current control, at a current density of 5 A/dm$^2$. The plates were anodized over 40 minutes, were washed with water, and were dried for 1 hour in a warm air drier at 60° C. A day later, one of the plates was observed under the electron microscope, which revealed a surface covered with microscopic pits having a number average inner diameter of 17 nm.

Two days later, the rest of the aluminum alloy plates were taken out. Those with holes were handled with gloves to prevent adhesion of oil or the like, and were inserted in an injection mold at 140° C. The mold was closed and then the same aromatic nylon resin composition as used in Example 3 was injected at an injection temperature of 280° C. The mold temperature was 140° C. There were obtained 12 integrated composites as illustrated in FIG. 2. The composites were subjected to a tensile test a day later. The average shear fracture force of 10 composites was 25.5 MPa (260 kgf/cm$^2$).

The invention claimed is:

1. A metal-resin composite, comprising:
    an aluminum alloy part the surface of which is covered with recesses having a number average inner diameter of 10 to 80 nm, as observed under an electron microscope, through a process of dipping in an aqueous solution of one or more compounds selected from ammonia, hydrazine, and a water-soluble amine compound; and a thermoplastic synthetic resin composition part, which is fixed by injection molding to the surface of said aluminum alloy part and which has a resin composition having a polyamide resin as a main component and an impact resistance modifier as an auxiliary component.

2. A metal-resin composite, comprising: an aluminum alloy part the surface of which is covered with recesses having a number average inner diameter of 10 to 80 nm, as observed under an electron microscope, through a process of dipping in an aqueous solution of one or more compounds selected from ammonia, hydrazine, and a water-soluble amine compound; and a thermoplastic synthetic resin composition part, which is fixed by injection molding to the surface of said aluminum alloy part and which has a main resin composition in which an aliphatic polyamide resin and an aromatic polyamide resin are simply mixed and/or said aliphatic polyamide resin and said aromatic polyamide resin are molecularly bonded.

3. A metal-resin composite, comprising: an aluminum alloy part the surface of which is covered with recesses having a number average inner diameter of 10 to 80 nm, as observed under an electron microscope, through a process of dipping in an aqueous solution of ammonia, hydrazine, or a water-soluble amine compound; and a thermoplastic synthetic resin composition part, which is fixed by injection molding to the surface of said aluminum alloy part and which has a resin composition having as a main component two or more aromatic polyamides selected from a group of different types of aromatic polyamides.

4. A metal-resin composite, comprising: an aluminum alloy part formed by anodizing and covered with a surface having holes the openings of which have a number average inner diameter of 10 to 80 nm as measured under electron microscope observation; and
    a thermoplastic synthetic resin composition part, which is fixed by injection molding to the surface of said aluminum alloy part and which has a resin composition having a polyamide resin as a main component and an impact resistance modifier as an auxiliary component.

5. A metal-resin composite, comprising: an aluminum alloy part formed by anodizing and covered with a surface having holes the openings of which have a number average inner diameter of 10 to 80 nm as measured under electron microscope observation; and
    a thermoplastic synthetic resin composition part, which is fixed by injection molding to the surface of said aluminum alloy part and which has a main resin composition in which an aliphatic polyamide resin and an aromatic polyamide resin are simply mixed, or said aliphatic polyamide resin and said aromatic polyamide resin are molecularly bonded.

6. The metal-resin composite according to claim 2 or 5, wherein said aliphatic polyamide resin is nylon 6 or nylon 66, and said aromatic polyamide resin is an aromatic nylon synthesized from phthalic acid and an aliphatic diamine.

7. A metal-resin composite, comprising: an aluminum alloy part formed by anodizing and covered with a surface having holes the openings of which have a number average inner diameter of 10 to 80 nm as measured under electron microscope observation; and
    a thermoplastic synthetic resin composition part, which is fixed by injection molding to the surface of said aluminum alloy part and which has a resin composition having as a main component two or more aromatic polyamides selected from a group of different types of aromatic polyamides.

8. The metal-resin composite according to claim 3 or 7, wherein said group of different types of aromatic polyamides is a group consisting of a polyamide from phthalic acid and hexamethylenediamine, a polyamide from isophthalic acid and hexamethylenediamine, and a polyamide from terephthalic acid and hexamethylenediamine.

9. The metal-resin composite according to any one of claims 1 to 7, wherein said thermoplastic synthetic resin composition comprises 1 to 200 parts by weight of a filler relative to 100 parts by weight of the resin composition.

10. The metal-resin composite according to claim 9, wherein said filler is one or more selected from glass fibers, carbon fibers, aramide fibers, calcium carbonate, magnesium carbonate, silica, talc, clay and glass powder.

11. A method for manufacturing a metal-resin composite, comprising the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and
    inserting said aluminum alloy part having undergone the dipping step into an injection mold, and injecting a thermoplastic synthetic resin composition of a resin composition having a polyamide resin as a main component and an impact resistance modifier as an auxiliary component, to mold a resin composition part and bond the resin composition part to the surface of said aluminum alloy part.

12. A method for manufacturing a metal-resin composite, comprising the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and inserting said aluminum alloy part having undergone the dipping step into an injection mold, and injecting a thermoplastic synthetic resin composition having a main resin composition in which an aliphatic polyamide resin and an aromatic polyamide resin are simply mixed, or said aliphatic polyamide resin and said aromatic polyamide resin are molecularly bonded, to mold a resin composition part and bond the resin composition part to the surface of said aluminum alloy part.

13. A method for manufacturing a metal-resin composite, comprising the steps of: performing dipping in an aqueous solution of one or more compounds selected from ammonia, hydrazine, and a water-soluble amine compound, to obtain a surface of an aluminum alloy part covered with recesses having a number average inner diameter of 10 to 80 nm; and inserting said aluminum alloy part having undergone the dipping step into an injection mold, and injecting a thermoplastic synthetic resin composition of a resin composition having as a main component two or more polyamides selected from the group consisting of a polyamide from phthalic acid and hexamethylenediamine, a polyamide from isophthalic acid and hexamethylenediamine, and a polyamide from terephthalic acid and hexamethylenediamine, to mold a resin composition part and bond the resin composition part to the surface of said aluminum alloy part.

14. A method for manufacturing a metal-resin composite, comprising the steps of: performing anodizing to obtain an aluminum alloy part surface covered with holes the openings of which have a number average inner diameter of 10 to 80 nm; and inserting said aluminum alloy part having undergone the anodizing step into an injection mold, and injecting a thermoplastic synthetic resin composition of a resin composition having a polyamide resin as a main component and an impact resistance modifier as an auxiliary component, to mold a resin composition part and bond the resin composition part to the surface of said aluminum alloy part.

15. A method for manufacturing a metal-resin composite, comprising the steps of: performing anodizing to obtain an aluminum alloy part surface covered with holes the openings of which have a number average inner diameter of 10 to 80 nm; and inserting said aluminum alloy part having undergone the anodizing step into an injection mold, and injecting a thermoplastic synthetic resin composition having a main resin composition in which an aliphatic polyamide resin and an aromatic polyamide resin are simply mixed, or by molecularly bonding said aliphatic polyamide resin and said aromatic polyamide resin, to mold a resin composition part and bond the resin composition part to the surface of said aluminum alloy part.

16. A method for manufacturing a metal-resin composite, comprising the steps of: performing anodizing to obtain an aluminum alloy part surface covered with holes the openings of which have a number average inner diameter of 10 to 80 nm; and inserting said aluminum alloy part having undergone the anodizing step into an injection mold, and injecting a thermoplastic synthetic resin composition of a resin composition having as a main component two or more polyamides selected from the group consisting of a polyamide from phthalic acid and hexamethylenediamine, a polyamide from isophthalic acid and hexamethylenediamine, and a polyamide from terephthalic acid and hexamethylenediamine, to mold a resin composition part and bond the resin composition part to the surface of said aluminum alloy part.

* * * * *